United States Patent [19]

Draper et al.

[11] Patent Number: 5,273,838
[45] Date of Patent: Dec. 28, 1993

[54] DOUBLE INTERCONNECTION FUEL CELL ARRAY

[75] Inventors: Robert Draper, Churchill Boro; Gregory E. Zymboly, Murrysville, both of Pa.

[73] Assignee: Westinghouse Electric Corp., Pittsburgh, Pa.

[21] Appl. No.: 957,114

[22] Filed: Oct. 7, 1992

[51] Int. Cl.$^5$ ............................................. H01M 8/10
[52] U.S. Cl. ...................................... 429/31; 429/32; 429/33
[58] Field of Search .................... 429/31, 30, 32, 33

[56] References Cited

U.S. PATENT DOCUMENTS

| | | | |
|---|---|---|---|
| 4,108,850 | 4/1992 | Carlson et al. | 429/31 |
| 4,431,715 | 2/1984 | Isenberg | 429/30 |
| 4,490,444 | 12/1984 | Isenberg | 429/31 |
| 4,699,852 | 10/1987 | Yokoyama et al. | 429/31 |
| 4,791,035 | 12/1988 | Reichner | 429/31 |
| 4,833,045 | 5/1989 | Pollack et al. | 429/30 |

OTHER PUBLICATIONS

Unexamined Japanese Patent Publication No. 63-81768 (Kaneko et al.).

Primary Examiner—Anthony Skapars
Attorney, Agent, or Firm—Daniel P. Cillo

[57] ABSTRACT

A fuel cell array (10) is made, containing number of tubular, elongated fuel cells (12) which are placed next to each other in rows (A, B, C, D), where each cell contains inner electrodes (14) and outer electrodes (18 and 18'), with solid electrolyte (16 and 16') between the electrodes, where the electrolyte and outer electrode are discontinuous, having two portions, and providing at least two opposed discontinuities which contain at least two oppositely opposed interconnections (20 and 20') contacting the inner electrode (14), each cell (12) having only three metallic felt electrical connectors (22) which contact surrounding cells, where each row is electrically connected to the other.

10 Claims, 3 Drawing Sheets

DOUBLE INTERCONNECTION FUEL CELL ARRAY

GOVERNMENT CONTRACT

The Government of the United States of America has rights in this invention pursuant to Contract No. DE-AC-2180-ET-17089, awarded by the United States Department of Energy.

BACKGROUND OF THE INVENTION

Square pitched, series-parallel interconnection of solid oxide electrolyte fuel cells is well known, and taught in U.S. Pat. Nos. 4,490,444 and 4,833,045 (Isenberg and Pollack et al., respectively). The fuel cells used contain an air electrode coating on a cylindrical, porous support tube, where the air electrode is covered over about 300 degrees by a solid electrolyte film. Thus there is a 60 degree wide axial strip down the length of the cell. This remaining 60 degrees of air electrode surface is covered by an interconnection strip, as described in U.S. Pat. No. 5,108,850 (Carlson et al.). As a top layer, fuel electrode covers the solid electrolyte over 280 degrees of the electrolyte surface.

These cylindrical cells are placed in a square pitch, series-parallel connected array, wherein the air electrode of one cell is connected to the fuel electrode of the adjacent series-connected cell by virtue of plated interconnection strip and a strip of sintered nickel felt. Other nickel felts provide parallel connections between the fuel electrodes of adjacent cells. The series path is essential for the generation of a practical D.C. stack voltage. The parallel connections provide paths by which the current can circumnegotiate an open circuit cell. Fuel flows axially in the passages formed between the quadrants of groups of four cells. The voltage across two rows of solid oxide fuel cells is approximately 2 volts. It is highly desirable to find a configuration that would increase the row voltage.

During the processing of fuel cells of the above described configuration there is a strong tendency for the cell to bow in such a manner that the interconnection strip lies along the outside of the curvature. It is postulated that this bowing is caused by densification of the air electrode material which is unmasked and therefore directly exposed to the metal chloride vapors during the pore closure phase of the interconnection growth. Very precisely regulated processing conditions minimize the bowing phenomenon and about cells 35 cm long, with thick support tubes, can easily be made with a quite acceptable bow. Much greater difficulty has been experienced with cells having an active length of 50 cm. The existence of significant bow makes it difficult to fabricate individual cells into bundles of cells.

In addition to the standard cell design described previously, unexamined Japanese Patent Publication No. 63-768 (Kaneko et al.) taught interconnections arranged in symmetrical positions, 180 degrees from each other, on the circumference of the oxygen electrode. This design alleviated cracking of the support, oxygen electrode, and electrolyte. Interconnecting this type cell to make an array or bundle would, however, appear difficult. Another design uses a completely circumferential interconnection, as taught by U.S. Pat. No. 4,791,035 (Reichner), which can result in either a square pitch or triangular pitch array. This design, however, substantially decreases gaseous fuel flow access between the cells to the outer fuel electrodes.

What is needed is an open array of fuel cells having increased row voltage and length, which cells would be uniform and substantially straight. It is one of the objects of this invention to provide such an array.

SUMMARY OF THE INVENTION

Accordingly, the present invention resides in a double interconnection fuel cell array, characterized in that a plurality of axially elongated fuel cells are disposed next to each other in a plurality of rows where each cell contains inner and outer electrodes with solid electrolyte between the electrodes, where the electrolyte and outer electrode are discontinuous, having two portions and providing at least two, axial, diametrically opposed discontinuities which contain at least two opposite opposed interconnections contacting the inner electrode, each fuel cell having only three metallic felt electrical connectors which contact surrounding cells, where the metallic felts electrically connect a central cell to only three surrounding cells, and where all cells in each row are electrically connected to each other through the metallic felts, and the rows are electrically connected to each other.

The felts are, preferably, thin nickel fiber strips. Alternate cells of a first row have no electric connection of one of its interconnections to a cell in an adjacent row. In all cases, current between rows of cells flows through the metallic felts only from alternate cells in a row.

Use of opposite opposed interconnections helps to eliminate bowing in 1 meter long cells and makes it more feasible to eliminate the support tube, one function of which was to help prevent bowing. This invention is also a means of circuiting fuel cells in such a manner as to provide twice the incremental stack voltage per row relative to existing practice.

BRIEF DESCRIPTION OF THE DRAWINGS

In order that the invention can be more clearly understood, convenient embodiments thereof will now be described, by way of example, with reference to the accompanying drawings, in which.

DESCRIPTION OF THE PREFERRED EMBODIMENTS

Figure 1:
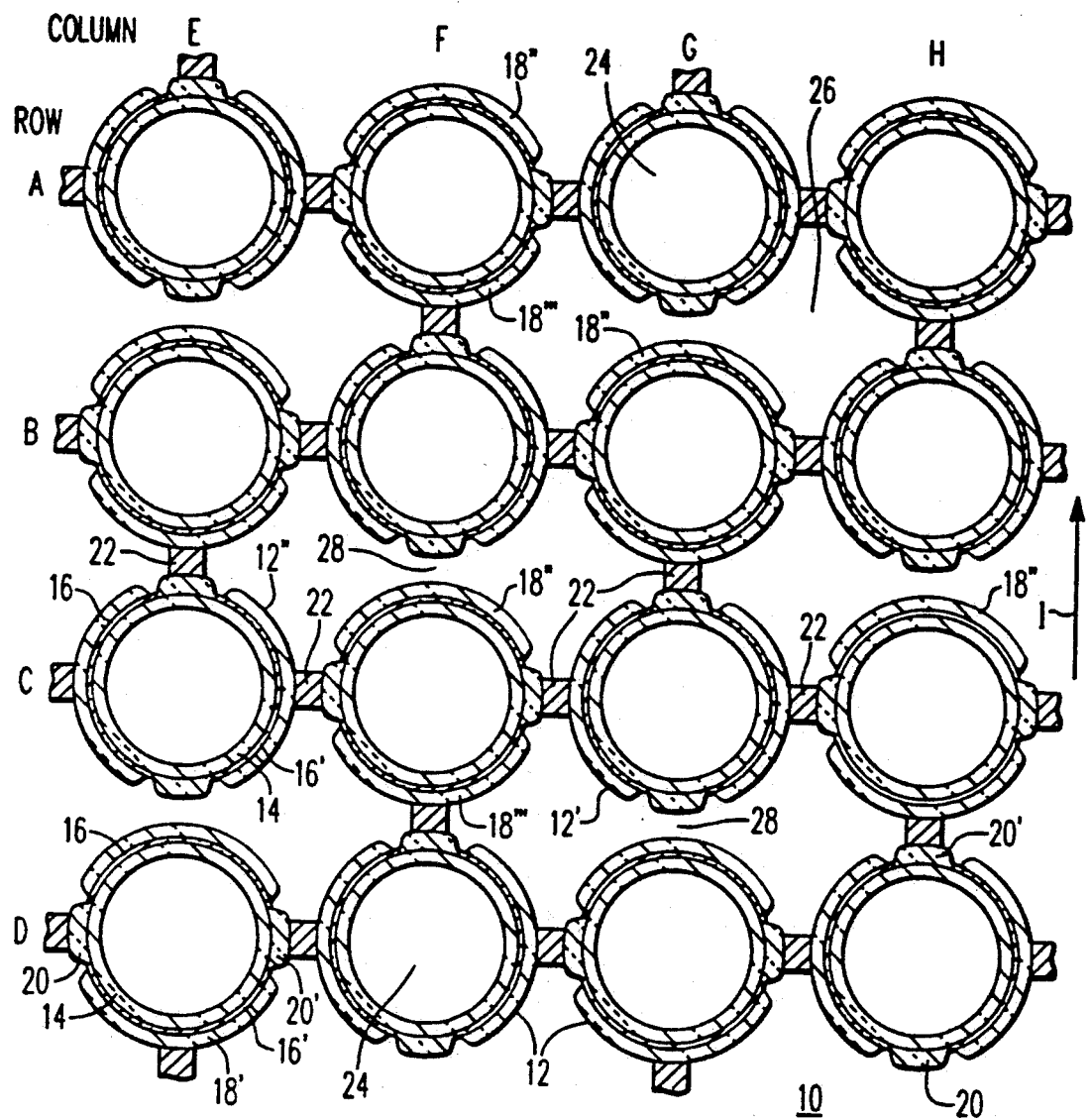
FIG. 1, which best shows the invention, is a cross-sectional view of one embodiment of the fuel cell array of this invention.

Referring now to FIG. 1, an array 10 of fuel cells 12 is shown, having rows A, B, C and D and columns E, F, G and H, with current flow direction shown generally as arrow I between rows. Each cell contains a self-supporting air electrode 14, discontinuous thin film solid oxide electrolyte portions 16 and 16', discontinuous fuel electrode portions 18 and 18', interconnections 20 and 20', and metallic felt electrical connectors 22. Oxidant such as air, shown in region 24, flows inside the cells, usually within a hollow feed tube (not shown), and gaseous fuel, such as CO, $H_2$ or their mixtures, shown in region 26 flows around the exterior and between the cells within the array 10. An optional support tube (not shown) can be used if necessary to help support the air electrode, as is well known in the art. Positions 28 between the tubular cells in adjacent rows not having a metallic felt between them, can be left vacant, or if extra support is needed, a high temperature insulating material, such as zirconia or alumina felt or the like can be inserted.

The air electrode, or cathode 14, that is, the electrode which will be in contact with the oxidant (air or oxygen), is in continuous form and will, when self-supporting, have a porous wall approximately 1 millimeter to 3 millimeters thick, preferably from 1 millimeter to 2 millimeters thick. The air electrode can comprise a tube comprising of porous doped lanthanum manganite, for example, calcia or strontia doped lanthanum manganite. Surrounding most of the outer periphery of the air electrode 14 is a discontinuous layer of gas-tight solid electrolyte 16 and 16', generally comprised of yttria-stabilized zirconia about 1 micrometer to about 100 micrometers thick (0.001 millimeter to 0.1 millimeter). The electrolyte sections together cover from about 220 degrees to 260 degrees of the air electrode circumference. The electrolyte can be deposited onto the air electrode by well-known, high temperature, electrochemical vapor deposition techniques. A preferred electrolyte composition is a stabilized zirconia, such as yttria stabilized zirconia, for example $(Y_2O_3)_{0.1}(ZrO_2)_{0.9}$.

The dense interconnection material 20, which can extend the active axial length of each elongated cell 12, must be electrically conductive in both an oxidizing and reducing environment. The interconnections 20 and 20', are deposited in the axial discontinuities of the electrolyte material and rest on top of the air electrode 14. The gas tight interconnection 20 is roughly similar in thickness to the electrolyte, about 30 micrometers to about 100 micrometers (0.03 millimeter to 0.1 millimeter). The interconnection should be non-porous (over about 95% dense) and preferably be nearly 99% to 100% electronically conductive at 1,000° C., the usual operating temperature of a fuel cell. The usual interconnection material is doped lanthanum chromite. Usually, a thin electrically conductive top layer, not shown, is deposited over the interconnection.

The final layer is the porous, discontinuous fuel electrode, or anode 18 and 18', which is generally composed of nickel or cobalt-zirconia cermet, preferably nickel-zirconia cermet, and is about 100 micrometers thick. A portion of the fuel electrode can be skeletal extension of the yttria-stabilized zirconia solid electrolyte material. Both electrodes are porous and high temperature electrically conductive, that is, conductive at the usual 1,000° C. cell-operating temperature.

As can be seen from FIG. 1, the electrolyte and outer fuel electrode are discontinuous along their length, providing axial, diametrically opposed discontinuities which contain opposite opposed interconnections 20 and 20' contacting the inner air electrode. Each cell, for example, cell 12', row C·column G, or cell C·G, has three metallic felt, electrical connectors 22. These felt connectors are preferably made from porous, fine, pressed, metal fibers, such as nickel fibers, and act as a support and electrical conductor between cells 12. The three metallic felt connectors 22 contact surrounding cells, where the metallic felts electronically connect a central cell 12' to only three surrounding cells, and where all the cells in row C as well as the other rows are electronically connected to each other through the metallic felts. Current between rows of cells, for example, rows B and C flows only between alternate cells, that is, cell 12' in row C column G, C·G, has current flowing to the cell in row B column G, and the cell 12" in row C, column E, cell C·E, has current flowing to the cell in row B, column E, as also shown in FIG. 3.

Figure 2:
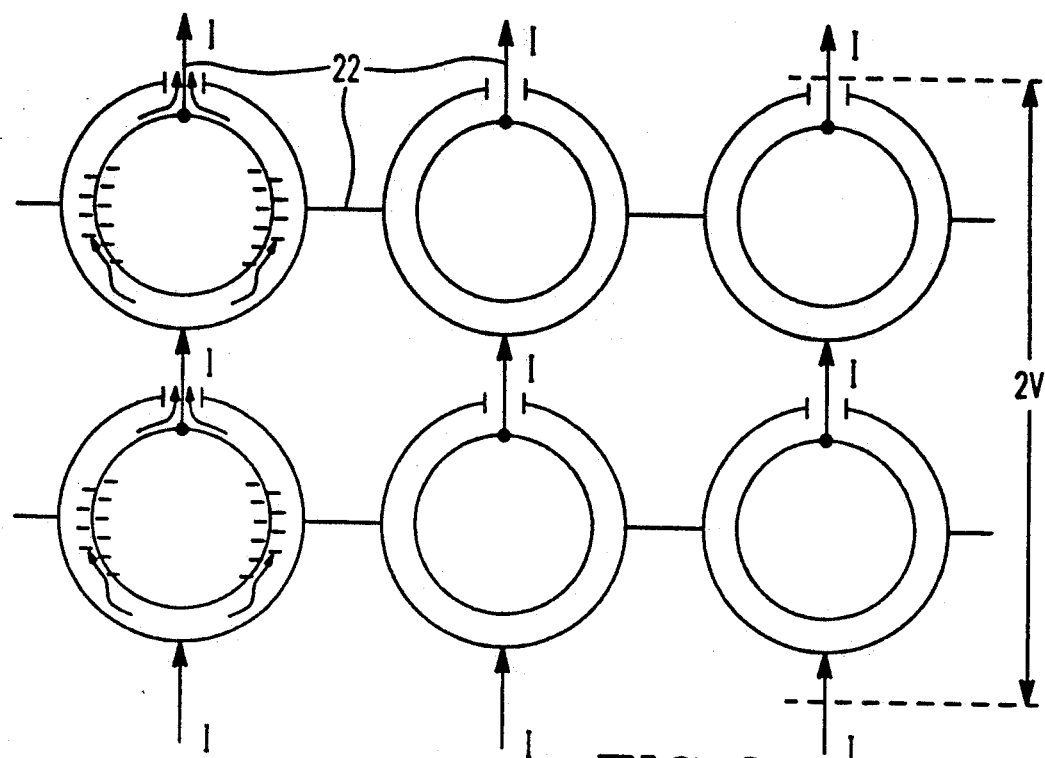
FIG. 2 is a schematic section view of a prior art, series-parallel electrical interconnection array.

FIG. 2 shows the prior art, standard series-parallel electrical connections where the cells of any given row are always electrically connected in parallel through the outer electrodes and metallic felt and consecutive cells along a column are always electrically connected in series from the inner air electrode of one cell to the outer fuel electrode of the next cell, generating 2 volts between rows and maintaining current flow between all cells. FIG. 3 shows the alternate electrical connection between rows by alternate cells in the row.

Figure 3:
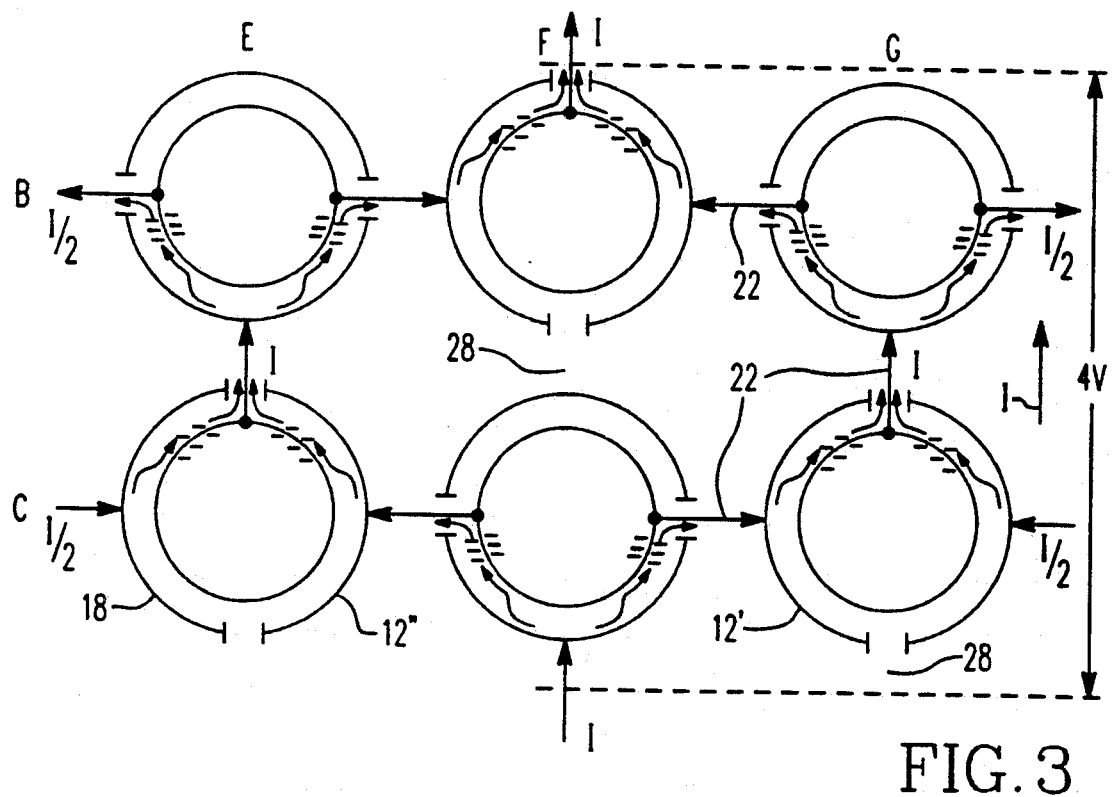
FIG. 3 is a schematic section view of the electrical interconnection array of this invention.

Referring to FIG. 1 and FIG. 3, in moving from cell to cell in a row, for example, row C, the diametrically opposed interconnections on the cells alternate from being in the 0° to 180° orientation, as in cell C·G, cell 12', to the 90°-270° orientation in cell C·H. The same alternating pattern exists when moving from cell to cell in a column, for example, column G. A metallic felt 22 connects each cell in every row, so that the air electrode 14 (cathode) of a given cell is connected through the interconnection and felt connector to the fuel electrode 18 (anode) of two adjacent cells within the row, for example, the air electrode of cell C·F is connected to fuel electrodes of cells 12' and 12". A metallic felt connector 22 connects every second cell within each column, so that the air electrode of one cell connects through the interconnection and felt connector to the fuel electrode of the next cell but then the columnar connection is broken. Adjacent columns of cells are staggered with respect to the location of felts. On half of the cells only one of the two interconnections is utilized. If it is necessary from a structural viewpoint to fill all of the felt positions, insulating felts can be used where nickel felts are absent, as at point 28.

The current flows from row to row as one proceeds from bottom to top of FIG. 1 and FIG. 3, as shown by the arrow I. The voltage increase from row to row within the stack or array of this invention is twice that of the prior art arrangement shown in FIG. 2. Power output is equal to the prior art arrangement but current level is half that of present practice. The advantages of requiring only half of present current include: less bulky conductors because of lower current density and need for fewer cell modules in series to generate D.C. voltage appropriate for inversion to A.C.

Figure 4:
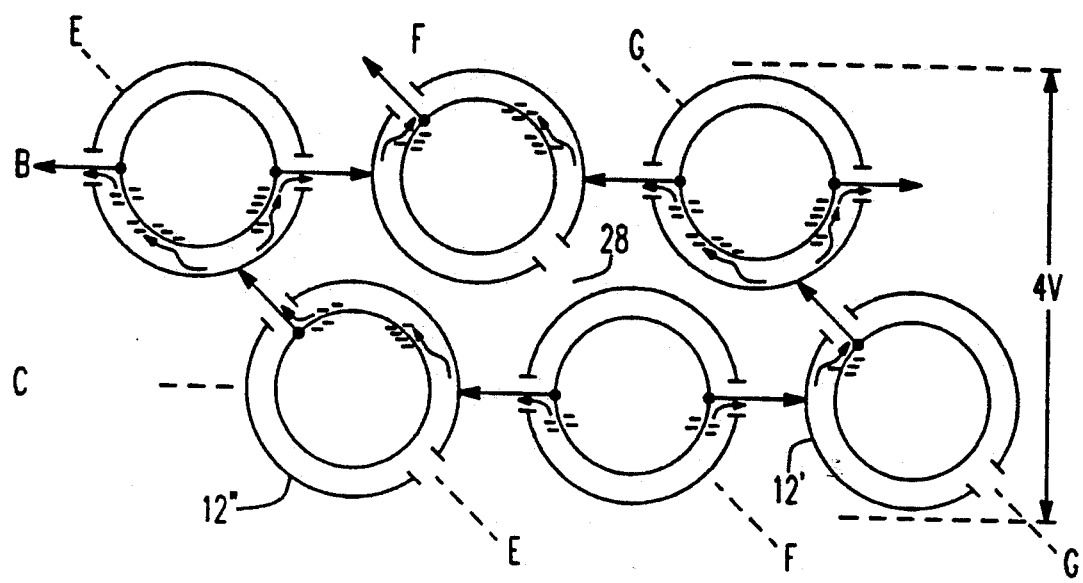
FIG. 4 is a cross-sectional view of another more compact embodiment of the fuel cell array of this invention.

FIG. 4 shows an alternative equilateral triangular cell pitch which provides a very compact array design. This design might be more likely to require insulator support felts at point 28 and elsewhere. In FIGS. 2, 3 and 4, electrons e— are shwon as—(dash) signs moving through and between cells.

Figure 5:
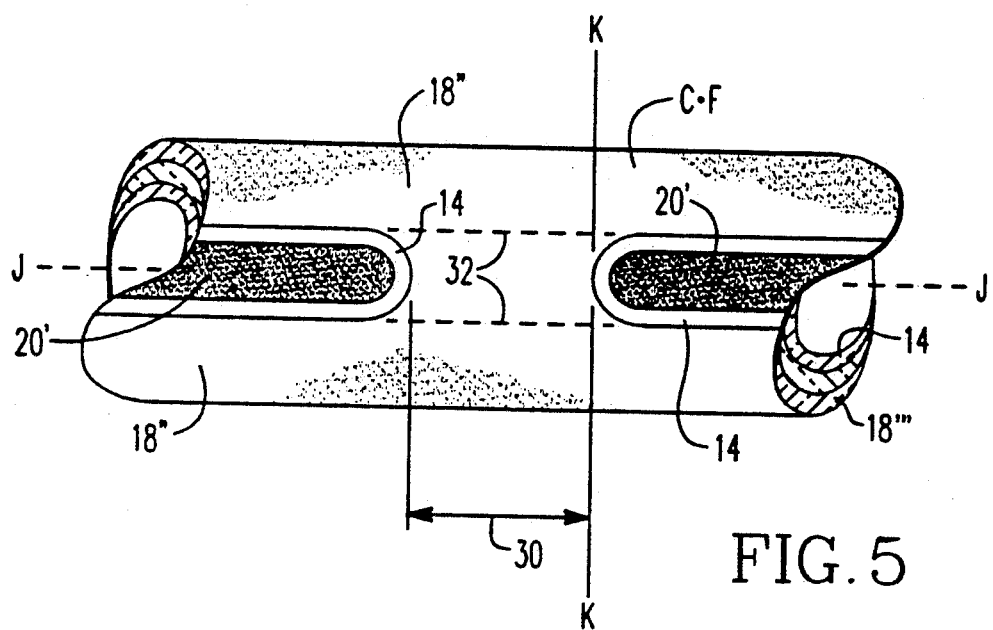
FIG. 5 is a schematic sectional view showing interconnection separation at the end or between the ends of a cell.

In order to fully utilize every fuel cell, the unconnected fuel electrode portion 18" of cells A·F, A·H, B·E, B·G, C·F, C·H, D·E and D·G of FIG. 1, should be connected electrically to the portion of the fuel electrode on the opposite side of the cell. This will allow electrons within, for example, fuel electrode 18" of cell C·F to travel to the opposite fuel electrode 18''', and pass as current to cells 12' and 12". This can be accomplished by making the fuel electrode longer than the interconnection strip, and connecting the electrode on at least one end of the cell. For example, in FIG. 5, if the cell would end along line K—K, the distance 30 at one or both ends of the cell would allow such connection. With long cells this might fail to provide adequate conductance, so it is preferred to make this fuel electrode connection as depicted in FIG. 5, at one or two places in the middle of the cell length, as shown. Since the fuel electrode is very conductive at high temperatures, satisfactory connection to both parts of the fuel electrode is easily obtained.

In FIG. 5, the cell shown can be thought of as cell C·F in FIG. 1 and FIG. 3, where the right interconnection 20' is shown on top of inner air electrode 14 and the fuel electrode top side 18" is joined to the fuel electrode bottom side 18'" through at least one "intermittent fuel electrode junction" 30 between the ends of the cell. Dotted lines 32 show the line along which the interconnection 20' would ordinarily be deposited. Thus, there are at least two diametrically opposed discontinuities in the electrolyte, where the air electrode can be seen—at 14, and at least two, and possibly four or six opposite opposed interconnections contacting the inner air electrode 14. FIG. 5, for examples shows cell C·F with two right side interconnections, while on the opposite side, not shown, there would be two more left side interconnections, a total of four.

When masking the air electrode to deposit electrolyte, a number of opposing masks could be laid down to provide a plurality of opposed discontinuities along the axial length of the cell, two of which are along axial line J—J in FIG. 5. The preferred design also solves problems of trying to mask long axial areas of air electrode, especially when cells are 1 meter to 2 meters long, and uniformly registering long continuous sections of metallic felt over such areas.

This fuel cell array could be placed in a generator and operated at a high temperature, where a fuel gas is fed to contact the outside electrode and an oxidant gas, such as air or oxygen, is fed to contact the inside electrodes, to generate electricity.

EXAMPLE

The ability of the cells equipped with two diametrically opposed interconnection to resist bowing during deposition of the interconnection was verified experimentally. Six double interconnection tubes were processed only with 53 single interconnection tubes at conditions designed to prevent bowing. All cells were of the thin wall, 50 cm active length, 66 cm overall length type. A substantial number of the single interconnection tubes exhibited significant bow while others appeared to be quite straight. None of the double interconnection cells exhibited bow. The experiment was repeated using four double interconnection tubes along with 55 single interconnection tubes. Again none of the tubes which exhibited bow were of the double interconnection type. The double interconnection tubes produced could easily be felted with nickel fiber and made into the array shown in FIG. 3, and since the cells were very straight, the more compact array shown in FIG. 4 would be equally possible.

We claim:

1. A double interconnection fuel cell array, comprising a plurality of axially elongated fuel cells are disposed next to each other in a plurality of rows where each cell contains inner and outer electrodes with solid electrolyte between the electrodes, where the electrolyte and outer electrode are discontinuous, providing at least two, axial, diametrically opposed discontinuities which contain at least two opposite opposed interconnections contacting the inner electrode, each fuel cell having only three metallic felt electrical connectors which contact surrounding cells, where the metallic felts electrically connect a central cell to only three surrounding cells, and where all cells in each row are electrically connected to each other through the metallic felts, and the rows are electrically connected to each other.

2. The fuel cell array of claim 1, where the air electrode is porous and comprises lanthanum manganite, the electrolyte is stabilized zirconia, and the fuel electrode comprises nickel-zirconia cermet.

3. The fuel cell array of claim 1, where the metallic felts are nickel fiber strips and the fuel cells are tubular.

4. The fuel cell array of claim 1, where alternate cells in a row have no electrical connection of one of its interconnections to a cell in an adjacent row.

5. The fuel cell array of claim 1, where metallic felts allow current flow between rows of cell only from alternate cells in a row.

6. The fuel cell array of claim 1, where there are two long opposite opposed interconnections for each cell.

7. The fuel cell array of claim 1, where those cells in adjacent rows not having a metallic felt between them, have a high temperature insulating material support between them.

8. the fuel cell array of claim 1, where those cells not having a metallic felt connected to one of the outer electrode portions, said outer electrode portion is electrically connected to the outer electrode portion on the opposite side of the cell by making the fuel electrode longer than the interconnection and connecting the electrode at least one end of the cell.

9. The fuel cell of claim 1, where those cells not having a metallic felt connected to one of the outer electrode portions, said outer electrode portion is electrically connected to the outer electrode portion in the opposite side of the cell by connecting the electrode at least one intermittent fuel electrode junction between the ends of the cell.

10. The array of claim 1, where a fuel gas is fed to contact the outside electrodes and an oxidant gas is fed to contact the inside electrodes.

* * * * *